United States Patent [19]
Pajunen

[11] 3,901,010
[45] Aug. 26, 1975

[54] SELF-CLEANING RAKE
[76] Inventor: Toivo W. Pajunen, Laurentian Hgts., Star Rt., Virginia, Minn. 55792
[22] Filed: Feb. 8, 1974
[21] Appl. No.: 440,783

[52] U.S. Cl. ............................................. 56/400.08
[51] Int. Cl.[2] ............................................ A01D 7/10
[58] Field of Search.......... 56/400.08, 400.09, 400.1

[56] References Cited
UNITED STATES PATENTS

| | | | |
|---|---|---|---|
| 1,132,334 | 3/1915 | Granger | 56/400.08 |
| 2,669,086 | 2/1954 | Kairis | 56/400.08 |
| 2,700,270 | 1/1955 | Thompson | 56/400.08 |

Primary Examiner—Russell R. Kinsey
Attorney, Agent, or Firm—Merchant, Gould, Smith & Edell

[57] ABSTRACT

A hand rake, having a header bar equipped with downwardly depending teeth and a handle extending perpendicularly from the header bar and teeth, is provided with a plurality of cleaning tines. The cleaning tines are mounted to freely swing with a pendulum action between the teeth responsive to reciprocatory movement of the rake longitudinally of its handle during a normal raking motion whereby trash, leaves, and the like caught between the rake teeth are removed. The cleaning tines are so mounted and shaped that portions thereof are disposed substantially at right angles to adjacent rake teeth during each increment of swinging movement of the cleaning tines between the rake teeth so that a maximum of force is exerted to remove the trash, leaves, and the like, longitudinally of the rake teeth.

4 Claims, 4 Drawing Figures

PATENTED AUG 26 1975         3,901,010

3,901,010

SELF-CLEANING RAKE

BACKGROUND OF THE INVENTION

1. Field of the Invention

The present invention relates generally to hand rakes and more particularly is directed toward a device for cleaning trash, leaves, etc. from between the teeth of the rake.

2. Description of the Prior Art

A particular problem with hand rakes is that the material being raked often becomes lodged between the raking teeth during use thereof. This, of course, results in repeated stops in the raking procedure for the purpose of dislodging such trash. Prior art attempts at overcoming this problem have resulted in rake constructions containing spring loaded cleaning tines, free swinging cleaning tines, or cleaning tines which depend on engagement with the surface being raked to operate. These devices have not been entirely successful for a number of reasons. By way of example, additional force is required to overcome the bias of the spring loaded type of cleaning tines, resulting in the operator expending more energy than usually necessary and becoming more quickly tired. Also, these spring loaded tines are not successful because they do not always have sufficient spring bias to eject or dislodge more tightly caught materials. Another problem with prior art rake cleaning devices is that such devices interfere with the normal raking motion or must be operated in a manner other than the normal raking motion to effect a dislodgement of trash or the like from the rake teeth. A still further problem with prior art structures is that some cleaning devices are not constructed to utilize correct leverage principles to provide a maximum cleaning effect under all conditions of use.

SUMMARY OF THE INVENTION

The present invention overcomes the above disadvantages by providing an elongated shaft pivotally mounted in close proximity to a rearward side of the header bar of a hand rake so as to have an axis of rotation disposed to extend generally parallel to the header bar. A plurality of cleaning tines are mounted on the elongated shaft for free swinging movements therewith through spaces between downwardly depending teeth on the header bar. The swinging movements result from reciprocatory movements of the rake longitudinally of a handle which extends from the rearward side of the header bar perpendicular to the header bar and rake teeth. The cleaning tines are shaped in a substantially semicircular configuration so that the particular portion of each cleaning tine which is adjacent a depending tooth, during a particular increment of the range of swinging movements of the cleaning tines between the depending teeth, is substantially perpendicular to the depending tooth over the entire range of swinging movements between the teeth. The close proximity of the elongated shaft to the header bar, and the positioning of the shaft at the juncture of the header bar and teeth, results in a maximum amount of leverage being applied to the cleaning tines on their downward stroke. A pendulum-like swinging action of the cleaning tines between the rake teeth results from normal reciprocatory raking motion longitudinally of the rake handle to continuously strip trash from between the rake teeth.

DESCRIPTION OF THE PREFERRED EMBODIMENT

Figure 1:
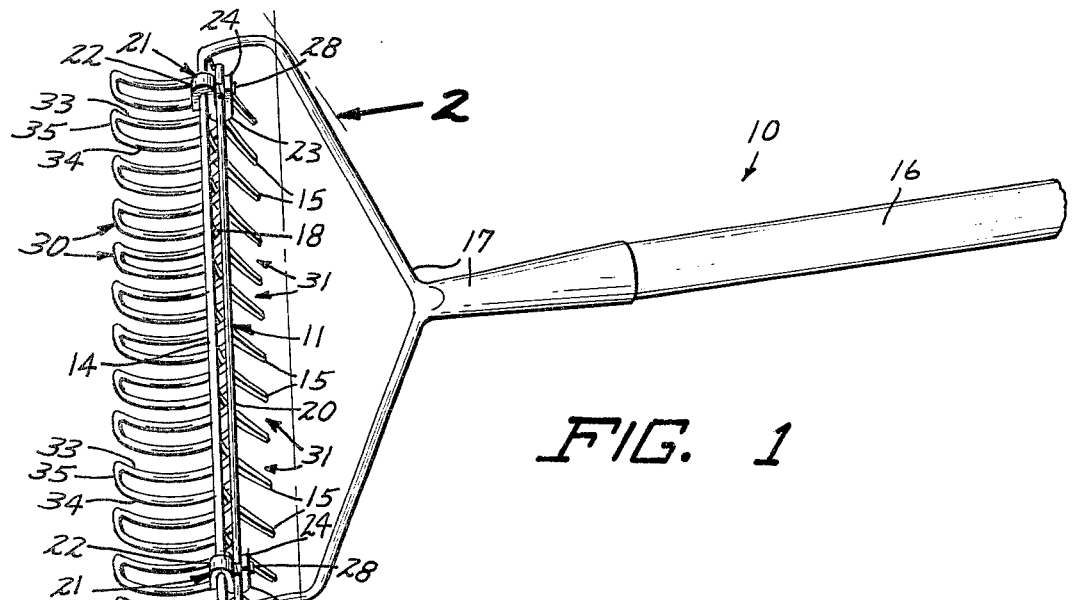
FIG. 1 is a view in perspective of a hand rake showing the cleaning attachment of the present invention mounted thereon.
Figure 2:
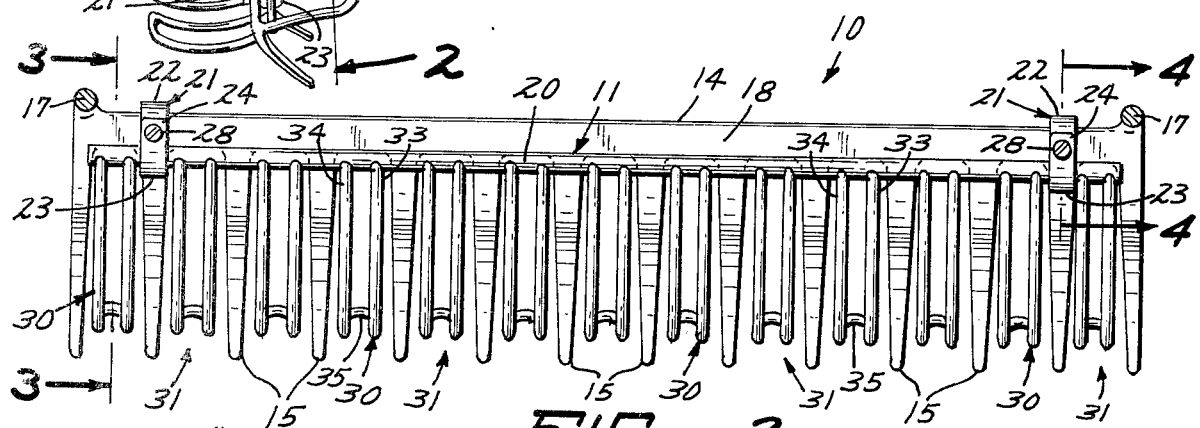
FIG. 2 is a view in vertical section as seen from the line 2—2 of FIG. 1, on an enlarged scale.

FIG. 1 of the drawings illustrates a conventional hand rake 10 on which a cleaning attachment 11 of the present invention is mounted. Hand rake 10 is of the thatching type which includes a rigid header bar 14 having a plurality of downwardly depending, generally rigid, equally spaced teeth 15. A handle 16 extends generally perpendicular from the header bar 14 and teeth 15, and a bracket 17 attaches the handle 16 to a rearward side 18 of the header bar 14.

Figure 4:
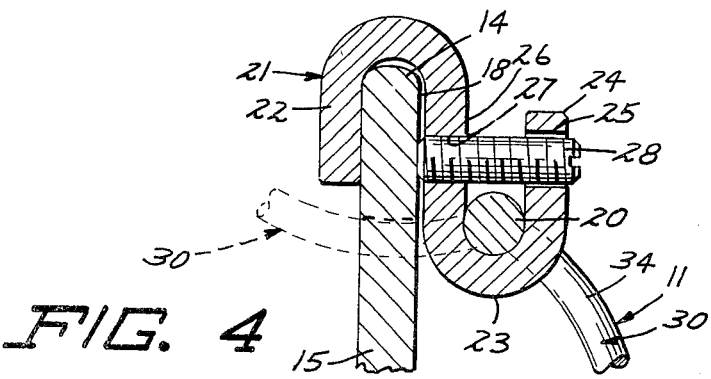
FIG. 4 is a greatly enlarged fragmentary sectional view as seen generally from the line 4—4 of FIG. 2.

As shown, the cleaning attachment 11 includes an elongated shaft 20. Bracket means, in the nature of a pair of reversed S-shaped bracket members 21, are provided for rotatably mounting the shaft 20 in close proximity to the rearward side 18 of the header bar 14 so as to have an axis of rotation which is disposed to extend generally parallel to the header bar 14 at the juncture of the teeth 15 with the header bar 14. Bracket members 21 each have a downwardly opening U-shaped portion 22 which receives and is positioned on the header bar 14 at spaced positions longitudinally thereof. Each bracket member 21 also includes an upwardly opening U-shaped portion 23 which has the shaft 20 rotatably mounted therein. One leg 24 of each of the U-shaped portions 23 has an opening 25 formed therein. An intermediate portion 26, which joins the U-shaped portions 22, 23 of each of the brackets 21, has an opening 27 formed therein. A set screw 28 is received through the opening 25 of each bracket member 21 and has threaded engagement within the opening 27 in the intermediate portion 26. The set screws 28 each engage the header bar 14 and retain the header bar 14 in the U-shaped portions 22, see FIG. 4.

Figure 3:
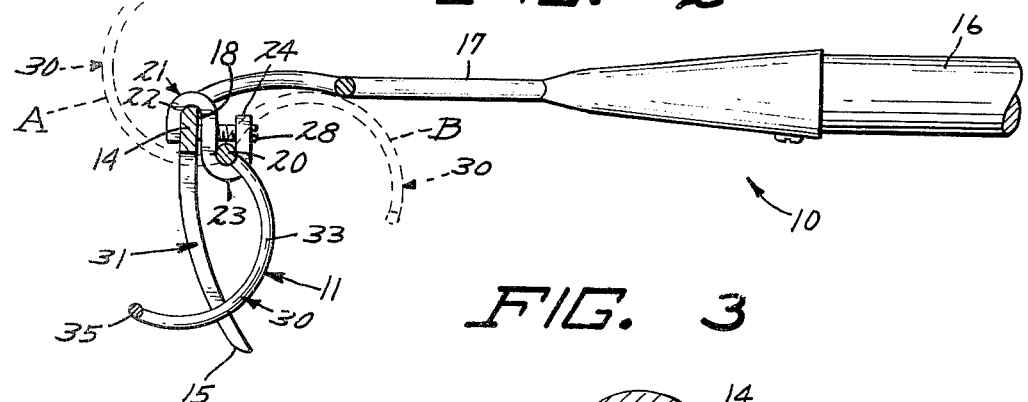
FIG. 3 is a view in vertical section as seen generally from the line 3—3 of FIG. 2, showing the cleaning attachment of FIGS. 1 and 2 and showing different positions of the cleaning tines relative to the rake teeth.

A plurality of equally spaced, arcuate cleaning tines 30 are mounted on the elongated shaft 20 for free swinging movements therewith through spaces 31 between the depending teeth 15 of the rake 10. With the rake in a rest position, as shown in FIG. 3, with the handle extending horizontally, the cleaning tines assume the position shown in full lines. In this position, the concave side of the arcuate tines face the rearward, slightly concave sides of the teeth 15. Each of the cleaning tines 30 is shaped such that the particular portion of each cleaning tine which is adjacent a depending tooth during a particular increment of the range of swinging movement of the cleaning tine between the depending teeth is substantially perpendicular to the depending tooth over the entire range of swinging movements between the teeth. In the particular arrangement shown, this is a generally semicircular, arcuate shape. One end of each arcuate tine 30 is connected to shaft 20 and the other free end 32 projects forwardly through a respective space 31 between the depending teeth 15. As can be seen particularly in FIG. 3 of the drawings, this semicircular shape of the cleaning tines 30 along with the particular positioning of the elongated shaft 20 in close proximity to the header bar 14 substantially at the juncture of the teeth 15 with the header bar 14, provides a maximum amount of leverage for the cleaning tines 30 to strip trash, leaves, etc. longitudinally from the teeth 15.

Under normal raking conditions, the rake 10 is moved in a reciprocatory motion longitudinally of the handle 16. This motion causes the tines 30 to swing freely about the axis of rotation of the shaft 20. The particular arrangement of the tines 30 in relation to the teeth 15 described above, causes the tines 30 to remove dry grass, trash, or the like, not shown, from between the teeth 15 in a direction longitudinally thereof during normal raking motions of the rake 10. As the rake is pulled forwardly through the grass, the cleaning tines 30 are pushed by the grass to the position A of FIG. 3. When the rake is lifted from the grass at the end of the pulling stroke, and moved back to start a new stroke, the cleaning tines 30 fall by gravity to the full line position of FIG. 3 to clean trash from between the teeth. If necessary, the rake can be jerked to cause the tines 30 to move to position B of FIG. 3.

In order to limit the weight which is added to the outer end of the rake 10 by the cleaning attachment 11, each of the tines 30 is formed from a pair of arms 33, 34 depending from the shaft 20. The arms 33, 34 are positioned between and in close proximity to a pair of the depending teeth 15 so as to effectively strip trash or the like from between the teeth 15. Each pair of arms 33, 34 has a free end which includes a connecting portion 35 for maintaining the arms 33, 34 in a parallel coextensive relationship with each other and in a desired position relative to adjacent teeth 15.

What is claimed is:

1. A cleaning attachment for hand rakes of the type including a rigid header bar having a plurality of downwardly depending generally rigid teeth spaced longitudinally thereof, a handle which extends generally perpendicular from a rearward side of the header bar and teeth and a bracket attaching the handle to the header bar, said cleaning attachment comprising:
   a. an elongated shaft;
   b. bracket means for rotatably mounting said elongated shaft in close proximity to the header bar so as to have an axis of rotation disposed to extend generally parallel to the header bar along the rearward side of the header bar;
   c. a plurality of spaced cleaning tines, each formed in a generally semicircular shape, mounted on said elongated shaft for free swinging pendulum like movements therewith through spaces between the depending teeth of the header bar;
   d. said tines each comprising a pair of arms depending from said elongated shaft and projecting forwardly between and in close proximity to a pair of the depending teeth, each arm having a free end, and a connecting portion connecting each said pair of arms at their free ends; and
   e. said cleaning tines each being shaped and mounted such that the particular portion of each cleaning tine which is adjacent a depending tooth during a particular increment of the range of swinging movement of said cleaning tine between the depending teeth is substantially perpendicular to the depending teeth over the entire range of swinging movements between the teeth.

2. The structure of claim 1 wherein said elongated shaft is disposed in close proximity to the juncture of each tooth with the header bar.

3. A cleaning attachment for hand rakes of the type including a rigid header bar having a plurality of downwardly depending generally rigid teeth spaced longitudinally thereof, a handle which extends generally perpendicular from a rearward side of the header bar and teeth and a bracket attaching the handle to the header bar, said cleaning attachment comprising:
   a. an elongated shaft;
   b. bracket means for rotatably mounting said elongated shaft in close proximity to the header bar so as to have an axis of rotation disposed to extend generally parallel to the header bar along the rearward side of the header bar, said bracket means comprising:
      i. a pair of bracket members each having a reverse S-shaped body including a pair of oppositely opening U-shaped portions and an intermediate portion joining said U-shaped portion;
      ii. said bracket members each having one U-shaped portion thereof receiving the header bar of the rake at longitudinally spaced positions on the header bar;
      iii. the other of said U-shaped portions of each bracket member having said elongated shaft rotatably mounted therein, one leg of said other U-shaped portion of each bracket member having an opening formed therein and said intermediate portion of each bracket member having an opening formed therein; and
      iv. a set screw extending through said opening in said one leg of each bracket member and having threaded engagement with said opening in respective ones of said intermediate portions, said set screws each engaging the header bar to retain the header bar in respective ones of said one U-shaped portions and said elongated shaft in respective ones of said other U-shaped portions;
   c. a plurality of spaced cleaning tines mounted on said elongated shaft for free swinging pendulum like movements thereabout through spaces between the depending teeth of the header bar; and
   d. said cleaning tines each being shaped such that the particular portion of each cleaning tine which is adjacent a depending tooth during a particular increment of the range of swinging movement of said cleaning tine between the depending teeth is substantially perpendicular to the depending teeth over the entire range of swinging movements between the teeth.

4. The structure of claim 3 wherein said one U-shaped portion opens downwardly and said other U-shaped portion opens upwardly.

* * * * *